(12) United States Patent
Struik

(10) Patent No.: US 8,245,279 B2
(45) Date of Patent: Aug. 14, 2012

(54) METHOD AND APPARATUS FOR SYNCHRONIZING AN ADAPTABLE SECURITY LEVEL IN AN ELECTRONIC COMMUNICATION

(75) Inventor: Marinus Struik, Toronto (CA)

(73) Assignee: Certicom Corp., Mississauga, ON (CA)

( * ) Notice: Subject to any disclaimer, the term of this patent is extended or adjusted under 35 U.S.C. 154(b) by 1240 days.

(21) Appl. No.: 10/921,161

(22) Filed: Aug. 19, 2004

(65) Prior Publication Data
US 2005/0081032 A1 Apr. 14, 2005

Related U.S. Application Data

(60) Provisional application No. 60/495,874, filed on Aug. 19, 2003.

(51) Int. Cl.
*H04L 29/06* (2006.01)

(52) U.S. Cl. ............. 726/3; 713/151; 713/160; 709/227

(58) Field of Classification Search ...................... None
See application file for complete search history.

(56) References Cited

U.S. PATENT DOCUMENTS

| | | | |
|---|---|---|---|
| 5,301,287 A | | 4/1994 | Herrell et al. |
| 5,450,493 A | | 9/1995 | Maher |
| 5,638,448 A | | 6/1997 | Nguyen |
| 5,689,566 A | | 11/1997 | Nguyen |
| 6,101,543 A | * | 8/2000 | Alden et al. ............... 709/229 |
| 6,108,583 A | * | 8/2000 | Schneck et al. ............ 700/9 |
| 6,118,775 A | * | 9/2000 | Kari et al. ................. 370/349 |
| 6,272,632 B1 | | 8/2001 | Carman et al. |
| 6,510,349 B1 | * | 1/2003 | Schneck et al. ............ 700/9 |
| 6,760,768 B2 | | 7/2004 | Holden et al. |
| 6,782,473 B1 | | 8/2004 | Park |
| 6,865,426 B1 | * | 3/2005 | Schneck et al. ............ 700/9 |
| 6,918,034 B1 | | 7/2005 | Sengodan et al. |
| 6,928,544 B2 | | 8/2005 | Chu |
| 7,023,863 B1 | | 4/2006 | Naudus et al. |
| 7,024,609 B2 | | 4/2006 | Wolfgang et al. |
| 7,107,335 B1 | * | 9/2006 | Arcieri et al. ............ 709/224 |
| 7,233,948 B1 | | 6/2007 | Shamoon et al. |
| 7,302,564 B2 | | 11/2007 | Berlin |
| 7,467,406 B2 | | 12/2008 | Cox et al. |
| 7,526,807 B2 | | 4/2009 | Chao et al. |
| 7,600,038 B2 | | 10/2009 | Struik |

(Continued)

FOREIGN PATENT DOCUMENTS

EP 1 320 010 A2 6/2003

(Continued)

OTHER PUBLICATIONS

"Data and computer communications: networking and internetworking," Hura et al., pp. 337, 450, 453, 467, 471, 483, 484, 485, 489, 491, 526, 599, 609, 617, 618, 621, 937, 1086, 1117, 1118, & 1132, CRC Press, 2001.*

(Continued)

*Primary Examiner* — Oscar Louie
(74) *Attorney, Agent, or Firm* — Fish & Richardson P.C.

(57) ABSTRACT

A method of communicating in a secure communication system, comprises the steps of assembling as message at a sender, then determining a security level, and including an indication of the security level in a header of the message. The message is then sent to a recipient.

28 Claims, 5 Drawing Sheets

U.S. PATENT DOCUMENTS

| | | | |
|---|---|---|---|
| 7,657,531 | B2 | 2/2010 | Bisbee et al. |
| 2002/0035635 | A1 | 3/2002 | Holden et al. |
| 2003/0026255 | A1 | 2/2003 | Poeluev et al. |
| 2003/0035542 | A1 | 2/2003 | Kim |
| 2003/0119484 | A1 | 6/2003 | Adachi et al. |
| 2003/0226011 | A1 | 12/2003 | Kuwano et al. |
| 2004/0010691 | A1 | 1/2004 | Nelson |
| 2004/0028409 | A1 | 2/2004 | Kim et al. |
| 2004/0136527 | A1 | 7/2004 | Struik |
| 2004/0139312 | A1 | 7/2004 | Medvinsky |
| 2004/0255001 | A1 | 12/2004 | Oh et al. |
| 2005/0015583 | A1* | 1/2005 | Sarkkinen et al. ............ 713/150 |
| 2005/0076197 | A1 | 4/2005 | Struik |
| 2005/0081032 | A1 | 4/2005 | Struik |
| 2005/0086501 | A1 | 4/2005 | Woo et al. |
| 2005/0108746 | A1 | 5/2005 | Futagami et al. |
| 2006/0140400 | A1 | 6/2006 | Brown et al. |
| 2006/0210071 | A1 | 9/2006 | Chandran et al. |
| 2007/0058633 | A1 | 3/2007 | Chen et al. |
| 2007/0160059 | A1 | 7/2007 | Poeluev et al. |
| 2007/0195788 | A1 | 8/2007 | Vasamsetti et al. |
| 2007/0255954 | A1 | 11/2007 | Struik |
| 2008/0307524 | A1 | 12/2008 | Singh et al. |

FOREIGN PATENT DOCUMENTS

| | | |
|---|---|---|
| EP | 1 324 541 A2 | 7/2003 |
| EP | 1 326 157 A2 | 7/2003 |
| WO | WO2005083970 A1 | 9/2005 |

OTHER PUBLICATIONS

"Transmission Control Protocol," RFC 0793, Darpa Internet Program, Information Sciences Institute, University of Southern California, Sep. 1981.*

Sung at al.; "Design and Evaluation of Adaptive Secure Protocol for E-Commerce"; Proceedings of the Tenth International Conference on Computer Communications and Networks, Oct. 15-17, 2001, Arizona, U.S.A; pp. 32 to 39.

International Search Report from PCT/CA2007/000608.

Search Report from GB0623685.5.

Dierks, T. et al.; "The TLS Protocol"; RFC 2246; IETF; Jan. 1999; pp. 23, 28-30.

IEEE Standard 802.11; Standard for Telecommunications and Information Exchange between Systems—Local and Metropolitan Networks—Specific Requirements—Part 11: Wireless LAN Medium Access Control (MAC) and Physical Layer (PHY) Specifications; IEEE Press; 1999; pp. 34-41, 50-58.

Kent, S. et al.; "IP Authentication Header"; RFC 2402; IETF; Nov. 1998; 21 pages.

Kent, S. et al.; "Security Architecture for the Internet Protocol"; RFC 2401; IETF; Nov. 1998; 62 pages.

Specification of the Bluetooth System; Specification vol. 1—Core, Version 1.0B; Dec. 1, 1999; p. 160.

Office Action issued in U.S. Appl. No. 10/885,115 on Aug. 22, 2007; 10 pages.

Office Action issued in U.S. Appl. No. 10/885,115 on Jun. 23, 2008; 13 pages.

Advisory Action issued in U.S. Appl. No. 10/885,115 on Aug. 28, 2008; 3 pages.

Office Action issued in U.S. Appl. No. 10/885,115 on Oct. 27, 2008; 16 pages.

Office Action issued in U.S. Appl. No. 10/885,115 on May 8, 2009; 18 pages.

Office Action issued in U.S. Appl. No. 10/885,115 on Oct. 2, 2009; 16 pages.

Office Action issued in U.S. Appl. No. 10/885,115 on Jun. 4, 2010; 13 pages.

Advisory Action issued in U.S. Appl. No. 10/885,115 on Aug. 25, 2010; 3 pages.

Office Action issued in U.S. Appl. No. 10/885,115 on Jan. 21, 2011; 13 pages.

Office Action issued in U.S. Appl. No. 10/885,115 on Oct. 11, 2011; 14 pages.

Office Action issued in Canadian Application No. 2,434,992 on Sep. 14, 2011; 3 pages.

Search Report issued in U.K. Application No. 0418565.8 on Jan. 25, 2005; 4 pages.

Examination Report issued in U.K. Application No. 0418565.8 on Oct. 31, 2005; 7 pages.

Examination Report issued in U.K. Application No. 0418565.8 on Feb. 15, 2006; 2 pages.

Examination Report issued in U.K. Application No. 0418565.8 on Aug. 23, 2006; 3 pages.

Combined Search and Examination Report issued in U.K. Application No. 0721922.3 on Dec. 18, 2007; 5 pages.

Office Action issued in U.S. Appl. No. 11/735,055 on Jul. 13, 2010; 21 pages.

Office Action issued in U.S. Appl. No. 11/735,055 on Dec. 22, 2010; 14 pages.

Office Action issued in Chinese Application No. 200780020042.X on Jan. 14, 2004; 10 pages.

Extended European Search Report issued in European Patent Application No. 07719535.2 on May 13, 2011; 6 pages.

Official Action issued in Japanese Application No. 2009-504535 on Aug. 17, 2011; 9 pages.

* cited by examiner

METHOD AND APPARATUS FOR SYNCHRONIZING AN ADAPTABLE SECURITY LEVEL IN AN ELECTRONIC COMMUNICATION

This application claims priority from U.S. Provisional Application No. 60/495,874 filed on Aug. 19, 2003.

BACKGROUND OF THE INVENTION

1. Field of the Invention

The present invention relates to a method and apparatus for providing synchronizing an adaptable security level in an electronic communication.

2. Description of the Prior Art

In electronic communications, it is often necessary to prevent an eavesdropper from intercepting a message. It is also desirable to have an indication of the authenticity of a message, that is a verifiable identification of the sender. These goals are usually achieved through the use of cryptography. Private key cryptography requires sharing a secret key prior to initating communications. Public key cryptography is generally preferred as it does not require such a shared secret key. Instead, each correspondent has a key pair including a private key and a public key. The public key may be provided by any convenient means, and does not need to be kept secret.

There are many variations in cryptographic algorithms, and various parameters that determine the precise implementation. In standards for wireless communications, it has been customary to set these parameters in advance for each frame type. However, this approach limits the flexibility of the parameters.

When one device is communicating with several other devices, it will often need to establish separate parameters for each communication.

It is an object of the present invention to obviate or mitigate the above disadvantages.

SUMMARY OF THE INVENTION

In accordance with one aspect of the present invention, there is provided a method of communicating in a secure communication system, comprising the steps of assembling a message at a sender, then determining a security level, and including an indication of the security level in a header of the message. The message is then sent to a recipient.

In accordance with another aspect of the present invention, there is provided a method of providing a security level to a sender by including information in an acknowledgement message.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
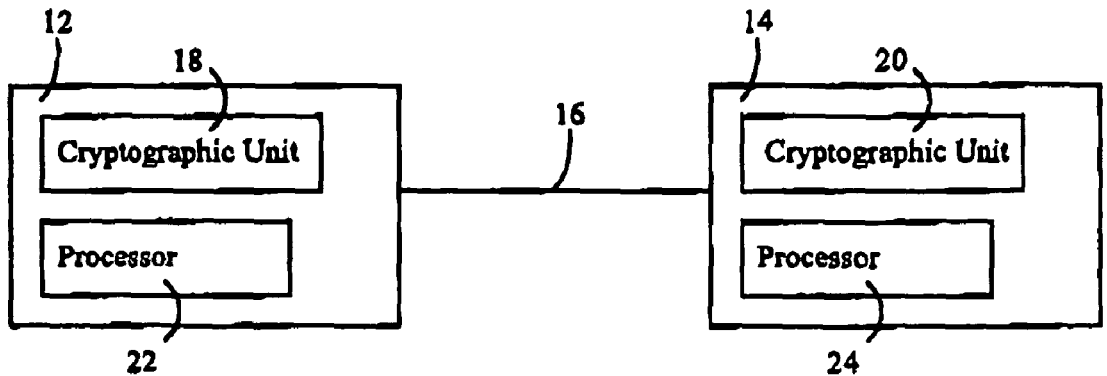
FIG. 1 is a schematic representation of a communication system.

Referring to FIG. 1, a communication system 10 includes a pair of correspondents 12, 14 connected by a communication link 16. Each correspondent 12, 14 includes a respective cryptographic unit 18, 20.

Each correspondent 12, 14 can include a processor 22, 24. Each processor may be coupled to a display and to user input devices, such as a keyboard, mouse, or other suitable devices. If the display is touch sensitive, then the display itself can be employed as the user input device. A computer readable storage medium is coupled to each processor 22, 24 for providing instructions to the processor 22, 24 to instruct and/or configure processor 22, 24 to perform steps or algorithms related to the operation of each correspondent 12, 14, as further explained below. The computer readable medium can include, by way of example only, magnetic disks, magnetic tape, optically readable medium such as CD ROM's, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM provided in a support system. It should be noted that the above listed example mediums can be used either alone or in combination.

Figure 2:
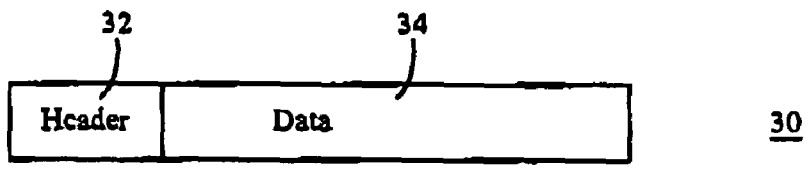
FIG. 2 is a schematic representation of an information frame exchanged in the communication system of FIG. 1.

Referring to FIG. 2, a frame used in communications between the correspondents 12, 14 is shown generally by the numeral 30. The frame 30 includes a header 32 and data 34. The header 32 includes information about the source and destination of the frame 30 and is used for processing frames. The header 32 may contain other control information as will be understood by those skilled in the art.

Figure 3:
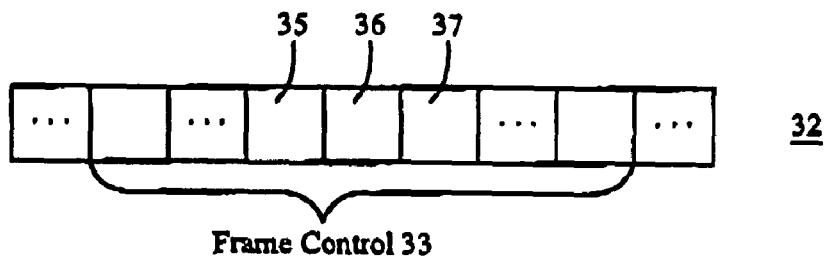
FIG. 3 is a schematic representation of a frame control portion of the frame of FIG. 2.

Referring to FIG. 3, the header 32 also contains frame control bits 33. The frame control bits 33 include security bits 35, 36, and 37. Security bit 35 indicates whether encryption is on or off. Security bits 36 and 37 together indicate the integrity level, such as 0, 32, 64, or 128 bits. It will be recognized that providing security bits in each frame allows the security level to be modified on a frame-by-frame basis rather than on the basis of a pair of correspondents, therefore providing greater flexibility in organizing communications.

In order to provide security, certain minimum security levels may be used. These levels should be decided upon among all of the correspondents through an agreed-upon rule. This rule may be either static or dynamic.

Figure 4:
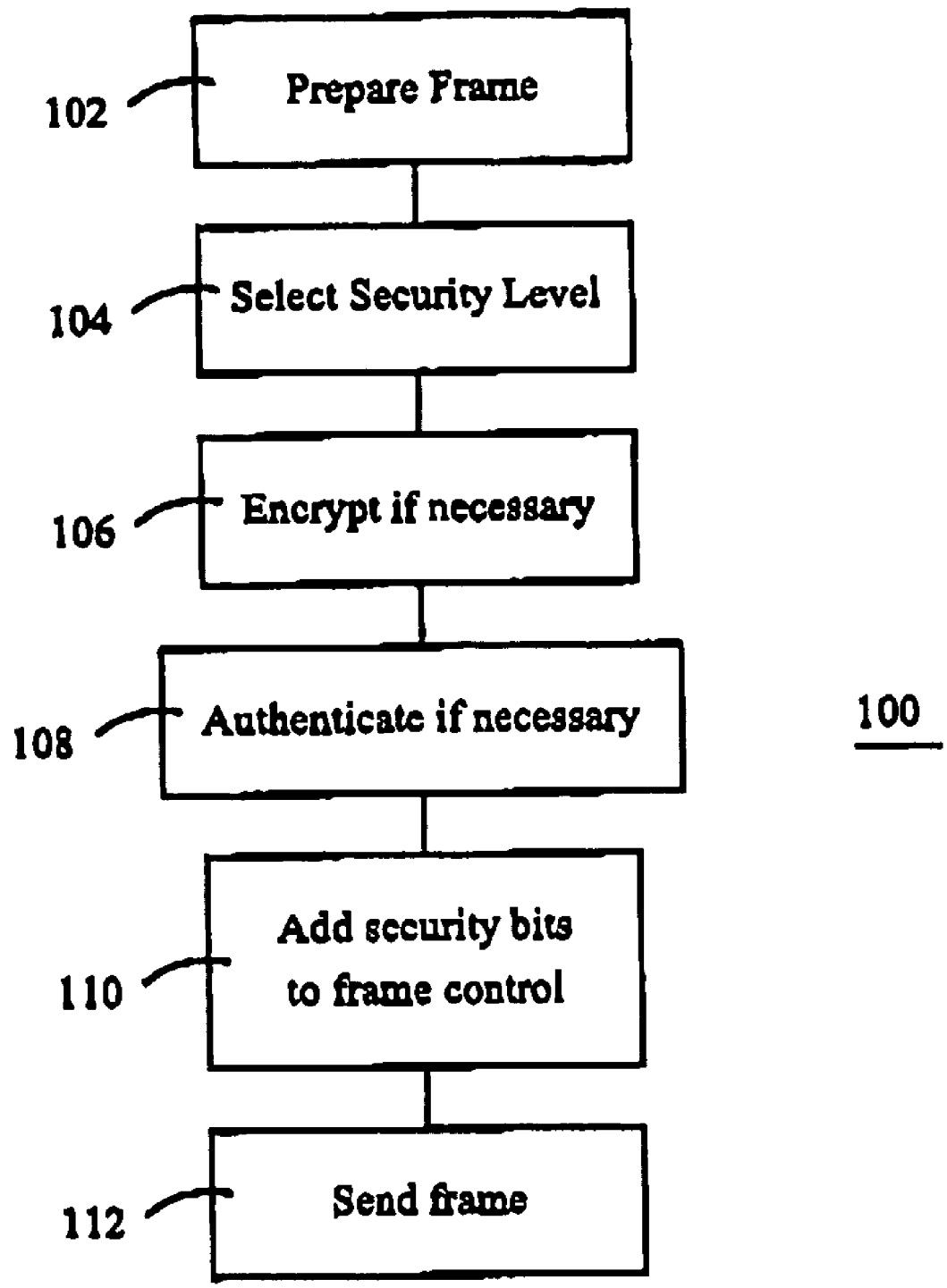
FIG. 4 is a schematic representation of a method performed by a sender in FIG. 1.

In operation, the correspondent 12 performs the steps shown in FIG. 4 by the numeral 100 to send information to the correspondent 14. First, the correspondent 12 prepares data and a header at step 102. Then it selects the security level at step 104. The security level is determined by considering the minimum security level required by the recipient, the nature of the recipient, and the kind of data being transmitted. If the security level includes encryption, then the correspondent 12 encrypts the data at step 106. If the security level includes authentication, then the correspondent 12 signs the data at step 108. Then the correspondent 12 includes bits indicating the security level in the frame control at step 110. The correspondent 12 then sends the frame to the correspondent 14.

Figure 5:
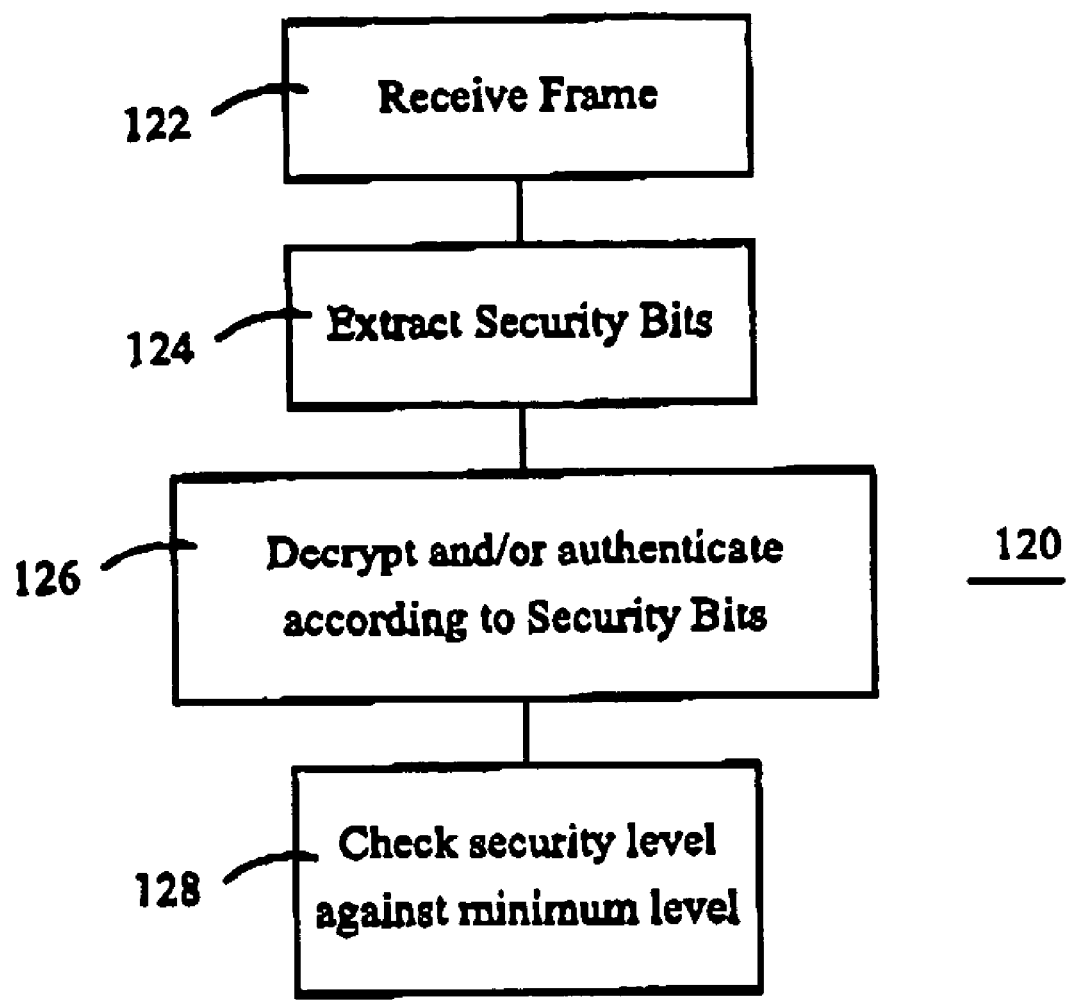
FIG. 5 is a schematic representation of a method performed by a recipient in FIG. 1.

Upon receiving the frame, the correspondent 14 performs the steps shown in FIG. 5 by the numeral 120. The correspondent 14 first receives the frame at step 122. It then extracts the security bits at step 124. If the security bits indicate encryption, then the correspondent 14 decrypts the data at step 126. If the security bits indicate authentication, then the correspondent 14 verifies the signature at step 126. Finally, the correspondent 14 checks the security level to ensure it meets predetermined minimum requirements. If either the encryption or authentication fails, or if the security level does not meet the minimum requirements, then the correspondent 14 rejects the message.

It will be recognized that providing security bits and an adjustable security level provides flexibility in protecting each frame of the communication. It is therefore possible for the sender to decided which frames should be encrypted but not authenticated. Since authentication typically increases the length of a message, this provides a savings in constrained environments when bandwidth is at a premium.

In a further embodiment, the correspondent 12 wishes to send the same message to multiple recipients 14 with varying minimum security requirements. In this case, the correspondent 12 chooses a security level high enough to meet all of the requirements. The correspondent 12 then proceeds as in FIG. 4 to assemble and send a message with the security level. The message will be accepted by each recipient since it meets each of their minimum requirements. It will be recognized that this embodiment provides greater efficiency than separately dealing with each recipient's requirements.

In another embodiment, a different number of security bits are used. The actual number of bits is not limited to any one value, but rather may be predetermined for any given application. The security bits should indicate the algorithm parameters. They may be used to determine the length of a key as 40 bits or 128 bits, the version of a key to be used, or any other parameters of the encryption system.

Figure 6:
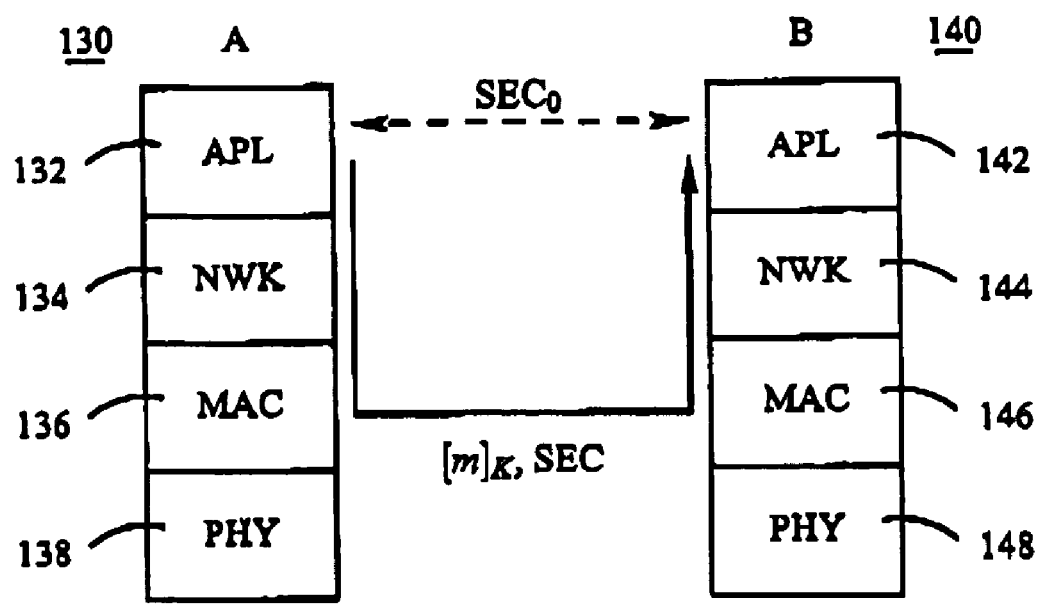
FIG. 6 is a schematic representation of a network protocol used in one embodiment of the communication system.

It will be recognized that in the above embodiments, a network stack may be used to organize communications between the correspondents. Referring therefore to FIG. 6, the a network stack of correspondent A is shown by the numeral 130. A network stack of correspondent B is shown by the numeral 140. The network stacks are organized into layers and have similar structures. The network stack 130 includes an application layer (APL) 132, a network layer (NWK) 134, a message authentication layer (MAC) 136, and a physical layer (PHY) 138. The network stack 140 includes similar components with similar numbering.

The sender determines how he wants to protect payload (and where to protect it, i.e., which layer). For the APL layer, security should be transparent; its role is limited to indicating at which level it wants to protect data (i.e., security services: none, confidentiality, data authenticity, or both). The actual cryptographic processing then is delegated to lower layers.

The recipient determines whether or not to accept protected payload, based on the received frame and locally maintained status information. The outcome of the cryptographic processing (done at the same layer as that of the sender), including info on the apparently offered protection level, is passed to the application layer, who determines whether the offered protection level was adequate. The recipient may acknowledge proper receipt of the frame to the original sender, based on this 'adequacy test'.

The acknowledgement (ACK), if present, is then passed back to the sender and passed up to the appropriate level (if protected message sent at APL layer, then ACK should also arrive back at that level; similar for lower layers of course).

The sender A determines that it wants to protect payload m using the protection level indicated by SEC (taking into account its own security needs and, possibly, those of its intended recipient(s). The payload m and desired protection level SEC is then passed to a lower layer (e.g., the MAC layer, as in the diagram) which takes care of the actual cryptographic processing. (This message passing could include additional status information that aids in the processing of the frame, such as the intended recipient(s), fragmentation info, etc. Note that the delegation of the cryptographic processing to a lower layer is only a conceptual step if cryptographic processing takes place at the same layer at which the payload m originates.) Cryptographic processing involves protecting the payload m and, possibly, associated information such as frame headers, using the cryptographic process indicated by the desired protection level SEC. The key used to protect this information is derived from shared keying material maintained between the sender and the intended recipient(s). After cryptographic processing, the protected frame, indicated by [m]K, SEC in FIG. 6, is communicated to the intended recipient(s) B.

The intended recipient (s) retrieves the payload m' from the received protected frame, using the cryptographic process indicated by the observed protection level SEC', using a key that is derived from shared keying material maintained between the sender and the recipient(s) in question. The retrieved payload m' and the observed protection level SEC' is passed to the same level at which the payload was originated by the sender, where the adequacy of the observed protection level is determined. The observed protection level SEC' is deemed sufficient, if it meets or exceeds the expected protection level $SEC_0$, where the parameter $SEC_0$ might be a fixed pre-negotiated protection level that does or does not depend on the retrieved payload m' in question. (Defining $SEC_0$ in a message-dependent way would allow fine-grained access control policies, but generally involves increased storage and processing requirements.)

The above approach works in contexts where expected and observed protection levels can be compared, i.e., where the set of protection levels is a partial ordering. An example is the context where protection involves a combination of encryption and/or authentication, with as ordering the Cartesian product of the natural ordering for encryption (encryption OFF<Encryption ON) and the natural ordering of authentication (ordered according to increasing length of data authenticity field). Moreover, if the set of protection levels has a maximum element, then the sender can use this maximum protection level to ensure that (unaltered) messages always pass the adequacy test.

In the above embodiments, each sender has to pre-negotiate the minimum expected protection level $SEC_0$ with each intended recipient. Thus, the approach might not be as adaptive as desirable for some applications and may involve additional protocol overhead at every change of the $SEC_0$ parameter. These disadvantages can be overcome by using the acknowledgement (ACK) mechanism from recipient(s) to sender as a feedback channel for passing the $SEC_0$ info. This is performed by incorporating in each acknowledgement message an indication as to the expected protection level. This information can then be collated by the original sender to update the minimum protection level expected by its recipient(s), whether or not this is message-dependent or not.

Figure 7:
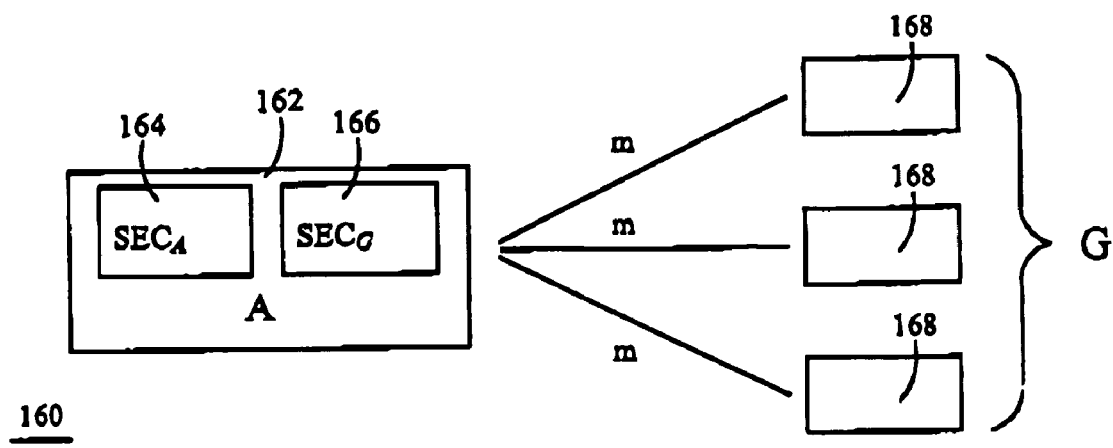
FIG. 7 is a schematic representation of an embodiment of the communication system.

In a further embodiment, a method of synchronizing security levels is shown. Referring to FIG. 7, another embodiment of the communication system is shown generally by the numeral 160. The system includes a sender A 162 and recipients 168 in a group labelled G. The sender A includes parameters $SEC_A$ 164 and $SEC_G$ 166.

Sender A wants to securely communicate a message m to a group G of devices. The sender A has access to the two parameters, i.e., (1) The minimum level $SEC_A$ at which it would like to protect this message (in general, $SEC_A$ might depend on the group it sends information to and the message itself, so proper notation would be $SEC_A(m,G)$);

(2) The minimum protection level $SEC_G$ that the group G of recipients expects (again, the proper notation would be $SEC_G(m,A)$ if this level would depend on the sender and the message itself as well). Here, the minimum expectation level of a group is the maximum over all group members of the minimum expectation level for each group member.

Initialization

Sender A assumes that each parameter $SEC_G$ is set to the maximum protection level (for each group G it securely communicates with).

Operational Usage

Sender A determines the minimum protection level $SEC_A$ at which it wants to protect the message m. The actual protection level SEC applied to the message m meets both its own adequacy test (i.e., $SEC \geq SEC_A$) and the minimum expected level by the group G (i.e., $SEC \geq SECG$).

Each recipient B that is in the group G of recipients (i.e., B ∈ G) indicates in its secure acknowledgement message the minimum expected protection level (for sender A and message m) at that particular moment of time.

A updates the parameter $SEC_G$ such that it is consistent with all the minimum protection levels indicated in each of the acknowledgement messages it received back (i.e., $SECG \geq SECB$ for all responding devices B).

Note that the procedure described above sends messages with a protection level that satisfies both the needs of the sender and expectations of recipient(s) and is adaptable to changes herein over time. Alternatively, the sender might only take its own protection needs into account, at the cost of potentially sending messages that will be rejected by one or more recipients due to insufficient—since less than expected—protection level.

The procedure described above can be generalized towards a general self-synchronization procedure for status information among devices in any network topology, where the feedback info on status information may be partially processed along the feedback path from recipient(s) towards sender already, rather than at the sender itself only (in the example above, this graph is a tree with root A and leaves the recipient(s) and the synchronization involves a specific security parameter).

Figure 8:
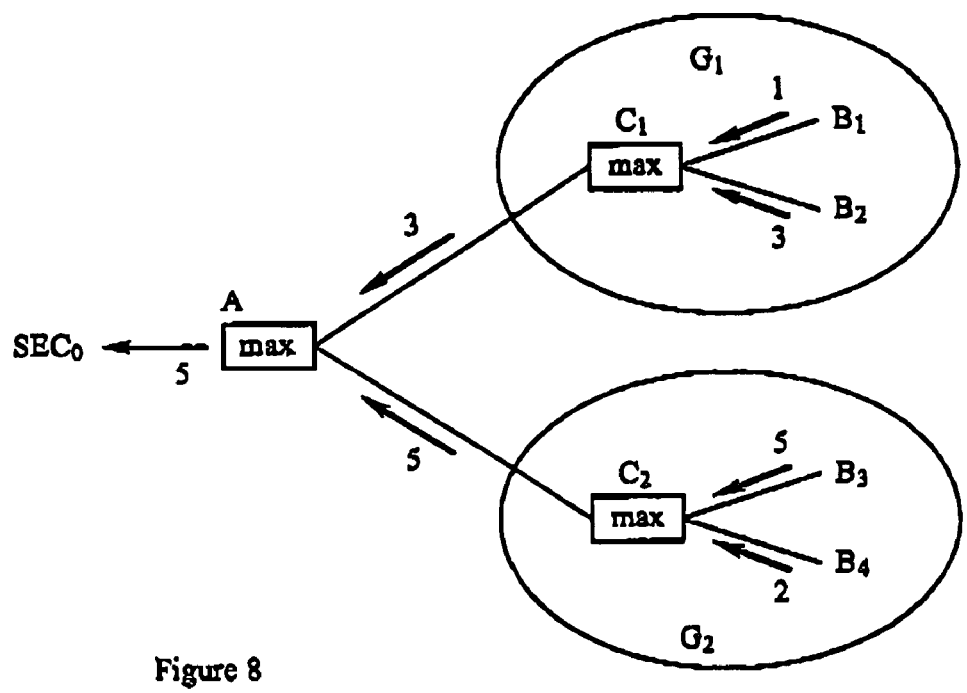
FIG. 8 is a schematic representation of another embodiment of the communication system.

As seen in FIG. 8, A sends a payload secured at protection level SEC to a group of devices consisting of B1-B4. The recipients B1-B4 provide feedback to the sender A on the expected protection level (indicated in the diagram as the integers 1, 3, 2, 5, where these integers are numbered in order of increasing protection level). The feedback is communicated back to A via intermediate nodes C1 and C2, who collect the respective feedbacks of devices in their respective groups G1 and G2 and process this, before returning a condensed acknowledge message representing both groups to sender A. The condensed feedbacks provided by these intermediate devices provides A with the same information on the minimum protection level that satisfies the expectations of all recipients as would have been the case if this information would have been forwarded to A without intermediate processing. (Here, we assume that the intermediate devices do not cheat in their calculations.)

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method of synchronizing parameters between a sender and at least one recipient in a communication system, said method comprising:

said sender preparing a message having a header, wherein said message is divided into at least one frame;

said sender determining one or more parameters for each frame of said message on a frame-by-frame basis based on known requirements of the sender and said at least one recipient, wherein said one or more parameters comprises a security level;

said sender individually associating with each frame, an indication of said one or more parameters, thereby allowing each frame to indicate different parameters to adapt to the nature of each frame on said frame-by-frame basis;

said sender sending each frame of said message to said at least one recipient according to said one or more parameters for that frame;

each said at least one recipient: receiving a protected message at a second layer of said recipient corresponding to a second layer of said sender; obtaining an initial message from said protected message using cryptographic processing based on said security level using a shared key; and passing said initial message and an indication of said security level to a first layer of said recipient corresponding to said first layer of said sender for checking that said security level meets predetermined security requirements; and said sender receiving a feedback response from each of said at least one recipient acknowledging receipt of said message, said feedback response being required by said sender from said each of said at least one recipient to confirm receipt of said message, said feedback response further comprising status information regarding said parameters for said each of said at least one recipient to thereby provide said status information to said sender at the same time as an existing acknowledgement required by said sender to confirm receipt of said message without requiring a dedicated channel and without requiring a separate communication.

2. A method according to claim 1 wherein each of said frames is selectively protected by a different type of security feature.

3. A method according to claim 1 further comprising:

said at least one recipient receiving said frames of said message from said sender;

said at least one recipient extracting said indication of said one or more parameters from said frames; and said at least one recipient checking said parameters to ensure such parameters satisfy predetermined requirements and rejecting respective frames if said parameters do not satisfy said predetermined requirements.

4. A method according to claim 3 wherein said message is protected by said sender prior to sending said message using one or more of encryption, signing and data authentication and operated on by said at least one recipient using one or more of decryption, verification and authentication subsequent to extracting said indication of said security level.

5. A method according to claim 3 wherein said message is encrypted by said sender prior to sending said message and is decrypted by said at least one recipient subsequent to extracting said indication of said security level.

6. A method according to claim 3 wherein said message is signed by said sender prior to sending said message and is authenticated by said at least one recipient subsequent to extracting said indication of said security level.

7. A method according to claim 3 wherein said at least one recipient sends said feedback response subsequent to checking said parameters, said feedback response including an update of said known requirements.

8. A method according to claim 1 wherein said message is protected by said sender prior to sending said message using one or more of encryption, signing and data authentication.

9. A method according to claim 1 wherein said known requirements include predetermined security requirements for one or more of said at least one recipient and said sender.

10. A method according to claim 9 wherein said parameters are chosen to meet all of said predetermined security requirements.

11. A method according to claim 1 further comprising updating said known requirements according to said feedback response.

12. A method according to claim 1 wherein said method of communicating is performed between said sender and a group of recipients, said method comprising determining said one or more parameters based on requirements of said sender and said group, sending said message to said group of recipients, receiving said feedback response from each member of said group, and updating said known requirements of said group based on said feedback responses.

13. A method according to claim 12 wherein said known requirements are based on said sender only.

14. A method according to claim 12 wherein said sender and said group are of the same entity, said method thus providing a self synchronization of said parameters of said sender.

15. A method according to claim 12 wherein said group comprises multiple groups and a central node intermediate of said sender and said multiple groups, said central node receiving multiple feedback responses from said multiple groups and communicating a single feedback response to said sender for updating said known requirements of said group.

16. A method according to claim 1, wherein said known requirements comprises known security requirements, and said status information comprises an indication of security requirements of said each of said at least one recipient.

17. A method according to claim 16 wherein said indication of said security level is represented by one or more security bits.

18. A method according to claim 16, wherein said sender determines said security level at said first layer of said sender; and wherein said method further comprises: said sender generating said protected message at a second layer of said sender using a shared key; and sending said frames at said second layer of said sender.

19. A method according to claim 1, further comprising incorporating said indication of said one or more parameters in said frame.

20. A method according to claim 1, wherein said feedback response comprises a secure acknowledgement message.

21. A method according to claim 1, wherein said feedback response enables a self-synchronization for said status information.

22. A method of synchronizing parameters between a sender and at least one recipient in a communication system, said method comprising:
each said at least one recipient receiving a message from said sender, said messaging having a header wherein said message is divided into at least one frame, each frame having associated therewith, one or more parameters determined by said sender on a frame-by-frame basis based on known requirements of the sender and said at least one recipient thereby allowing each frame to individually indicate different parameters to adapt to the nature of each frame on said frame-by-frame basis, wherein said one or more parameters comprises a security level;
each said at least one recipient determining said one or more parameters from a respective frame;
each said at least one recipient checking said one or more parameters to ensure said one or more parameters satisfy predetermined requirements and rejecting a corresponding frame if said one or more parameters do not satisfy said predetermined requirements;
each said at least one recipient: receiving a protected message at a second layer of said recipient corresponding to a second layer of said sender; obtaining an initial message from said protected message using cryptographic processing based on said security level using a shared key; and passing said initial message and an indication of said security level to a first layer of said recipient corresponding to said first layer of said sender for checking that said security level meets predetermined security requirements;
each said at least one recipient preparing a feedback response to acknowledge receipt of said message, said feedback response being required by said sender from each of said at least one recipient to confirm receipt of said message, said feedback response further comprising status information regarding said parameters for said at least one recipient to thereby provide said status information to said sender at the same time as an existing acknowledgement mechanism required by said sender to confirm receipt of said message without requiring a dedicated channel and without requiring a separate communication; and
each said at least one recipient sending said feedback response via a feedback channel provided by said existing acknowledgement mechanism required by said sender.

23. A method according to claim 22, wherein said one or more parameters comprises a security level, said known requirements comprises known security requirements, and said status information comprises an indication of security requirements of said each of said at least one recipient.

24. A method according to claim 22, wherein said determining said one or more parameters comprises extracting an indication of said one or more parameters from said frame.

25. A method according to claim 22, wherein said feedback response comprises a secure acknowledgement message.

26. A method according to claim 22, wherein said feedback response enables a self-synchronization for said status information.

27. A non-transitory computer readable medium comprising computer executable instructions for communicating between a sender and at least one recipient in a communication system, said non-transitory computer readable medium comprising instructions for:

said sender preparing a message having a header, wherein said message is divided into at least one frame;

said sender determining one or more parameters for each frame of said message on a frame-by-frame basis based on known requirements of the sender and said at least one recipient, wherein said one or more parameters comprises a security level;

said sender individually associating with each frame, an indication of said one or more parameters, thereby allowing each frame to indicate different parameters to adapt to the nature of each frame on said frame-by-frame basis;

said sender sending each frame of said message to said at least one recipient according to said one or more parameters for that frame;

said at least one recipient: receiving a protected message at a second layer of said recipient corresponding to a second layer of said sender; obtaining an initial message from said protected message using cryptographic processing based on said security level using a shared key; and passing said initial message and an indication of said security level to a first layer of said recipient corresponding to said first layer of said sender for checking that said security level meets predetermined security requirements; and said sender receiving a feedback response from each of said at least one recipient acknowledging receipt of said message, said feedback response being required by said sender from said each of said at least one recipient to confirm receipt of said message, said feedback response further comprising status information regarding said parameters for said each of said at least one recipient to thereby provide said status information to said sender at the same time as an existing acknowledgement required by said sender to confirm receipt of said message without requiring a dedicated channel and without requiring a separate communication.

28. A non-transitory computer readable medium comprising computer executable instructions for communicating between a sender and at least one recipient in a communication system, said non-transitory computer readable medium comprising instructions for:

each said at least one recipient receiving a message from said sender, said message having a header wherein said message is divided into at least one frame, each frame having associated therewith, one or more parameters determined by said sender on a frame-by-frame basis based on known requirements of the sender and said at least one recipient thereby allowing each frame to individually indicate different parameters to adapt to the nature of each frame on said frame-by-frame basis, wherein said one or more parameters comprises a security level;

each said at least one recipient determining said one or more parameters from a respective frame;

each said at least one recipient checking said one or more parameters to ensure said one or more parameters satisfy predetermined requirements and rejecting a corresponding frame if said one or more parameters do not satisfy said predetermined requirements;

each said at least one recipient: receiving a protected message at a second layer of said recipient corresponding to a second layer of said sender; obtaining an initial message from said protected message using cryptographic processing based on said security level using a shared key; and passing said initial message and an indication of said security level to a first layer of said recipient corresponding to said first layer of said sender for checking that said security level meets predetermined security requirements;

each said at least one recipient preparing a feedback response to acknowledge receipt of said message, said feedback response being required by said sender from each of said at least one recipient to confirm receipt of said message, said feedback response further comprising status information regarding said parameters for said at least one recipient to thereby provide said status information to said sender at the same time as an existing acknowledgement mechanism required by said sender to confirm receipt of said message without requiring a dedicated channel and without requiring a separate communication; and each said at least one recipient sending said feedback response via a feedback channel provided by said existing acknowledgement mechanism required by said sender.

* * * * *